Patented Sept. 17, 1940

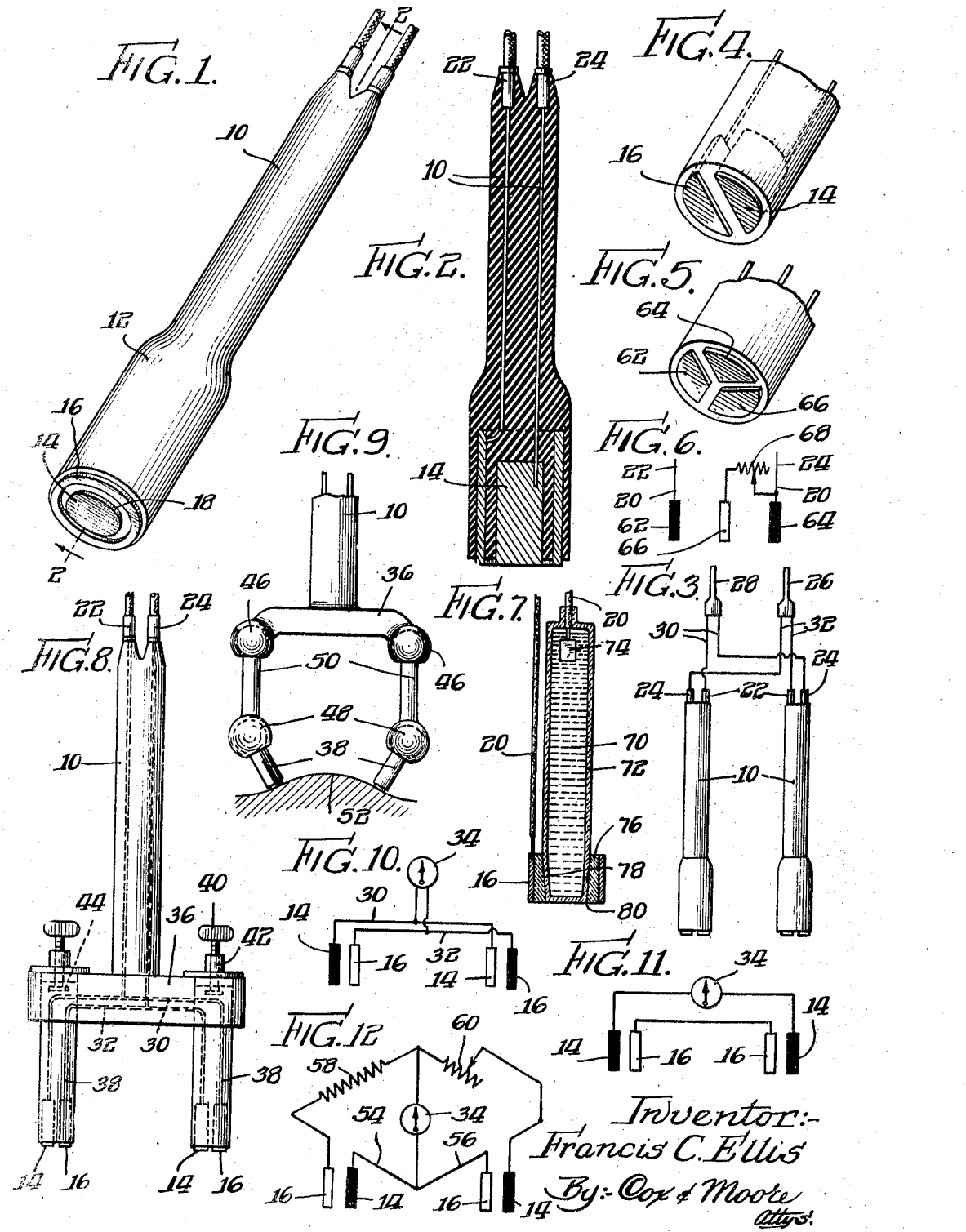

2,215,213

UNITED STATES PATENT OFFICE 2,215,213

ELECTRODE FOR MEASURING ELECTROLYTIC EFFECTS

Francis C. Ellis, Chicago, Ill.

Application December 11, 1937, Serial No. 179,253

12 Claims. (Cl. 175—183)

The present invention relates to electrodes and more particularly to an arrangement of electrodes for determining electrolytic effects.

It is an object of the present invention to provide an electrode of simple unitary construction having a plurality of pairs of dissimilar electrodes arranged in spaced relationship and connected in order to permit determination of the characteristics of spaced electrolytic substances.

The present invention more particularly comprehends the provision of an improved electrode structure and wiring which may be employed to indicate comparative electrolytic conditions at spaced positions. Although the present invention has applicability to a wide variety of uses, one practical application which is comprehended may be made in connection with the process disclosed in my co-pending application, Serial No. 96,589, filed August 18, 1936, wherein measurement and observation is made of electrolytic currents produced when dissimilar electrodes are contacted at spaced points to the surface of a living animal organism.

In proceeding in accordance with my prior invention, it is desirable in some instances, as for example in determining localized areas of inflammation in the animal organism, to make comparisons of spaced areas on the surface of the organism, one of which is known to be normal. Moreover, since the conclusions to be drawn from the measurements obtained are often dependent upon variation in conditions at spaced points in the same organism due to some local abnormality or inflammation, it has been found desirable to coincidentally make measurements at spaced points, either of which may be varied at will.

It is, accordingly, an important object of the present invention to provide a plurality of paired dissimilar electrodes, so electrically connected with a suitable indicating means as normally to give a zero, mean or datum reading when contacted with areas of equal or uniform electrolytic characteristics but will vary oppositely from this reading when one of the paired electrodes is contacted with an area of contrasting electrolytic character.

An additional object of the present invention is to provide a unitary electrode structure having dissimilar electrodes so positioned as to provide a plurality of electrolyte responsive means at spaced points, said electrodes being connected to indicate the relative activity of any electrolytic material contacted adjacent said spaced points.

A yet further object of the present invention is to provide a simple and effective apparatus for coincidentally and directly comparing the electrolytic characteristics of spaced electrolytic areas.

Numerous other objects and advantages will more fully appear during the course and progress of the following specification.

Referring to the drawing:

Figure 1 is a perspective view of an electrode unit which may be used in carrying out the present invention.

Figure 2 is a sectional elevation taken on the line 2—2 in Figure 1.

Figure 3 is a view of the electrode shown in Figures 1 and 2 connected in accordance with the present invention, the connections being shown in more or less diagrammatic form.

Figures 4 and 5 are perspective detail views of the end portions of other electrodes which may be employed in accordance with the present invention.

Figure 6 is a wiring diagram for the electrode shown in Figure 5.

Figure 7 is a sectional elevation taken through a yet further electrode which may be employed in accordance with the present invention.

Figure 8 is an elevational view of an additional simple form of electrode assembly for making measurements at points of predetermined spacing.

Figure 9 is a yet further alternative embodiment of the present invention.

Figures 10, 11 and 12 are circuit diagrams showing diagrammatically preferred alternative methods of connection which may be employed in accordance with the present invention.

The electrodes used in accordance with the present invention may be of the type shown in Figures 1 and 2, comprising an insulating handle portion 10 having an enlarged end portion 12 in which are mounted the electrodes proper 14 and 16. These electrodes 14 and 16 are preferably metallic, the central contact member 14 having a circular end portion while the outer contact member 16 is annular in form, the two being spaced by a suitable annular area 18 of insulating material. Preferably the aforementioned surfaces of the contact members 14 and 16 are coplanar so that they may be readily situated flatwise against any surface or substance, the electrolytic characteristics of which are to be measured. As shown more clearly in Figure 2, the members 14 and 16 are cylindrical and tubular in character, respectively, and are embedded in the insulating material of the handle member. A pair of conductors 20 make electrical contact with the contact members 14 and 16 and with terminals 22 and 24 which are connected in a manner to be hereinafter described with suitable electrical conduits.

The members 14 and 16 comprise substances which are known in the art as being "dissimilar" in that they are spaced in the electro-motive series; that is, which, when contacted with an electrolyte, will create a potential difference therebetween. While the contact members have been described as preferably comprising metal members, it will be obvious from this disclosure that the invention may be carried out with contact members of various substances whether solid, liquid or gaseous in character, provided they have or will, under conditions of employment, acquire a "dissimilar" character. Moreover, the shape or spacing of the contact members may be such as to suit the convenience of the particular electrolytic substance with which they are contacted.

Thus, attention is directed to the contact members 14 and 16 shown in Figures 4 and 5, which are segmental in form, and to the electrode structure shown in Figure 7 in which one of the contact members is formed of a liquid co. luctor. More specifically the electrode member shown in Figure 7 comprises one metallic electrode and a dissimilar liquid electrode to be described hereinafter more in detail.

The aforementioned electrodes are, in use, preferably connected as shown in Figure 3. Terminals 26 and 28 are connector members which are adapted to be affixed to the terminals of a suitable device for measuring or indicating electric current or potential such, for example, as a galvanometer. It will be noted, therefore, that the terminals 24 of the two electrode members 10 which make electrical connection with the contact members 14 are connected by means of conduits 30 and 32 to the terminals 26 and 28, respectively, while the terminals 22 on the two electrode members are connected by continuations of the same conduits to the terminals to which the opposite electrode of the other pair is attached. When the terminals 26 and 28 are connected to a suitable galvanometer, the resulting connections are as shown in the wiring diagram of Figure 10 of the drawing, the galvanometer being diagrammatically indicated at 34 while the contact members 14 and 16 are likewise diagrammatically represented as indicated by the corresponding numerals. It will be apparent that the electrode members are thus connected in opposition; that is, when currents of the same magnitude and direction originate at the pairs of electrodes, then no current will flow in the galvanometer 34.

Preferably the contact members 14 and 16 are, in both electrode members, composed of the same dissimilar materials and of substantially the same contacting area so that when they are contacted with identically the same or equivalent electrolytic materials, they will result in the production of equal electrolytic currents and a corresponding zero reading of the galvanometer 34. If, on the other hand, one of the pairs of electrodes be contacted with electrolytic material of such a character that a greater electrolytic current is produced, a corresponding current will tend to flow in the galvanometer so that this instrument will give a reading upon one side of the zero point. Should the comparative increase in current occur with respect to the other electrode member, then a current will flow in the opposite direction through the galvanometer, producing a reading on the other side of the zero point.

In other words, the present pair of electrode members is connected in opposition such that the currents produced thereby are neutralized with respect to the galvanometer when they are equal, but which produce a characteristic deflection of the galvanometer when they are subjected to the influence of electrolytes which are different in character. It will be understood from the above disclosure that the contact members 14 and 16 need not under all conditions be exactly the same dissimilar materials since these may be varied to produce any normal current flow in the galvanometer which may be taken as a mean or datum position. In any event, however, increased relative activation of one electrode member by contact with an electrolyte of increased activity, will always actuate the galvanometer needle in one direction from this mean or datum point, while superior activation of the other electrode member will always actuate the galvanometer in the other direction.

The unitary electrode structure shown in Figure 8 comprises two pairs of dissimilar electrodes more or less rigidly mounted with respect to a single handle member 10 and having fixed spacing. To this end the handle member 10, which is preferably of some insulating material, is connected rigidly at one end to a transverse member 36 which carries adjacent each end a pair of forwardly projecting arms 38. These arms are provided in their free end surfaces with contact members 14 and 16 which may be of any of the types hereinbefore described. Conduit members 30 and 32, extending within suitable hollow passages interiorly of the different portions of the electrode members, connect the two pairs of dissimilar electrodes to the terminals 22 and 24 in substantially the same manner as indicated in the wiring diagram of Figure 10. Attention is directed to the means provided for releasably attaching the projecting arms 38 to their transverse support 36 and comprising an adjustable thumb screw 40 threaded in the bushing 42 and releasably attachable to the ends of the arms, as at 44.

In use, this device may be grasped by the handle 10 and then the two pairs of electrodes on the ends of the forwardly projecting arms 38 may be pressed uniformly against or immersed in any desired electrolytic material or materials. When connected to a galvanometer 34, as hereinbefore mentioned, the deviation of the reading thereof from normal will indicate the comparative electrolytic activity of the electrolytes adjacent the pairs of electrodes.

The preferred alternative embodiment disclosed in Figure 9 comprehends the support and arrangement of pairs of electrodes such that their spacing and relative positioning may be varied within wide limits. To this end the transversely extending member 36 is provided at either end with ball and socket connections 46 to a pair of links 50. These links are in turn connected through ball and socket joints 48 to the forwardly projecting arms 38, each of which supports a pair of dissimilar electrodes on its end surface, as hereinbefore described. These electrodes are likewise preferably wired for attachment to a suitable galvanometer or the like.

The present type of electrode structure has particular adaptability for use in accordance with my aforementioned process for localizing abnormal inflamed areas. The arrangement of ball and socket joints connected by the movable links 50 permits the arrangement of the contact members so that they may be positioned flatwise against various portions of the surface of the organism regardless of the curvature thereof. Thus, for example, if 52 represents the back of a patient diagrammatically in transverse section, then the arrangement at which the parts are shown would be suitable for determining the relative pathologic activity on either side thereof. Thus, for instance, with the movable members set as shown in Figure 9, the electrode may be positioned so that each pair of dissimilar contact members is spaced on either side of the spine. By moving the pairs of electrodes and repositioning them at various spaced points along the spine, a comparison of the relative pathological activity of the two sides will appear from the resulting reading on the galvanometer. It will be apparent from the above disclosure that the handle portions 10 of the electrode units shown in Figures 8 and 9 may be positioned variously with respect to the other parts in accordance with the convenience of the operator. Thus, the handle member 10 may form an extension of the transverse member 36 or may be positioned at right angles to this member and to the forwardly projecting arms when in normal position.

The wiring diagrams shown in Figures 10 and 11 illustrate alternative preferred methods of electrically connecting the dissimilar contact members and of forming the circuit between these contact members and the galvanometer. The arrangement of these contact members, as shown in Figure 11, might be deemed a series arrangement as opposed to the generally parallel connections in Figure 10. It will be noted, however, that the contact members 16 are directly connected while the contact members 14 lead to opposite terminals of the galvanometer. Accordingly, the effect of electrolytic currents produced by the two pairs of contact members is to pass through the galvanometer circuit in opposite directions, thus tending to buck each other in the manner hereinbefore described.

The diagram shown in Figure 12 bears some general resemblance to a Wheatstone bridge, the pairs of dissimilar contact members being positioned in adjacent arms 54 and 56 thereof. The opposite side of the bridge may comprise a fixed resistor 58 and a variable resistor 60. The galvanometer is connected at one side at a point between the arms 54 and 56 and at its other side between the arms formed by the two resistors. This arrangement permits ready adjustment of the zero or datum point on the galvanometer. Thus, for example, should the pairs of electrodes be of different character or should the other characteristics of any of the elements of the circuit be such as to vary the calibration of the instrument 34, then it will be apparent that adjustment of the resistor 60 may compensate for this factor. So, too, when the reading given by the galvanometer is extremely high or off scale, the magnitude thereof may be determined from the quantity of resistance which must be added or subtracted in the arm 60.

Returning to the specific structure of the electrodes shown in Figure 5, it will be noted that three contact surfaces, namely, 62, 64 and 66, are provided and may be composed of three dissimilar materials. The preferred wiring diagram for this type of electrode is shown in Figure 6 and comprises the conduit members 20 connecting the contacts 62 and 64 to the terminals 22 and 24. The third contact 66, however, is connected to one only of the conduits 30 through the intermediary of the variable resistor 68. The main purpose of this type of electrode is to permit control of the "dissimilar" contact members.

Thus, when it is desired to produce currents of known magnitude with a known electrolyte and with dissimilar contact members of fixed size, the controlling factor is the spacing of the dissimilar materials in the electro-motive series. Materials of the desired spacing are not always available and, accordingly, it is proposed to employ alloys. Various difficulties, however, attend the employment of alloyed materials. In the electrode structure shown in Figures 5 and 6, however, the two individual electrodes 64 and 66 act together as though they were alloyed in a single electrode, but corrections may be made for the presence of impurities or other variables, for example, by adjustment of the resistance 68.

The electrode structure shown in Figure 7 comprises a body of a suitable conducting liquid 70 enclosed in a suitable, preferably insulating vessel 72. A conduit member 20 connects with the conducting liquid 70 through the agency of a conducting member 74 immersed therein. The lower end of the vessel 72 is tapered and is provided with an annular ring 76 which is ground to fit the said tapered end. The dissimilar annular contact member 16 is mounted about the annular ground member 76 due to the presence of the aperture 78 communicating with the ground joint between the lower end of the vessel 72 and the annular ring 76, the conducting liquid 70 is given access to the ground joint and is caused to flow therethrough by capillary attraction. Accordingly, therefore, when the lower face of this electrode member is pressed against an electrolytic material with the conduits 20 attached in one of the hereinbefore mentioned circuits, an electrolytic action will be set up between the electrolyte, the contact member 16 and the second dissimilar contact material formed by the dissimilar liquid material 70 which extends to the annular line formed by the lower edge of the ground joint. Preferably the vessel 72 and the annular ring 76 may be formed of some nonconductor such as glass. It will be obvious from this disclosure that the vessel form of the dissimilar materials employed is generally immaterial.

The present invention provides a simple and effective means for determining relative electrolytic activity. The instruments may be readily controlled and calibrated and serve to give at all times an unmistakable characteristic indication of the relative electrolytic activity of two or more electrolytically active areas.

It is thought that the invention and numerous of its attendant advantages will be understood from the foregoing description and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

I claim:

1. An electrode means comprising a manually manipulatable device having a plurality of pairs of spaced contact members formed of dissimilar materials insulatingly supported on said device, and terminal means for connection to an electric current measuring means, said pairs of contact members being electrically connected to the terminal means in opposition so that the current measured by the measuring means is equivalent to the difference in the current produced by each pair, said pairs of contact members having contact portions located adjacent an outer surface of the said device and being cooperably arranged for coincidental application to the surface of a mass to be electrolytically measured.

2. An electrode means for determining the relative electrolytic activity of a plurality of electrolytes comprising a manually manipulatable device comprising a plurality of pairs of spaced contact members, each pair being composed of substances of dissimilar electro-motive characteristics, said pairs of contact members having contact portions located adjacent an outer surface of said device and being cooperably arranged for coincidental application to the surface of a mass to be electrolytically measured, at spaced points and electric current indicating means, said pairs of contact members being electrically connected to the terminal means in opposition so that the current indicated by the current indicating means is a function of the current produced by both pairs.

3. Means for determining the relative electrolytic activity of spaced electrolytic areas comprising a manually manipulatable device comprising electrode means having a plurality of spaced pairs of dissimilar contact members said pairs of contact members having contact portions located adjacent an outer surface of the said device and being cooperably arranged for coincidental application to the surface of a mass to be electrolytically measured, and terminal means for connection to an electric indicating means, said pairs being connected to said indicating means in opposition whereby to produce a predetermined or datum reading of said indicating means when said pairs of electrodes are contacted with equivalent electrolytes and to produce a variation from said reading when either of said pairs are contacted with a material of superior electrolytic activity.

4. Means for determining the relative electrolytic activity of spaced electrolytic areas comprising a manually manipulatable device having a plurality of spaced pairs of dissimilar contact members said pairs of contact members having contact portions presented outwardly of an outer surface of said unit and cooperably arranged for coincidental application to the surface of a solid mass to be electrolytically measured, and indicating means electrically connected with each of said pairs of contact members in such a manner that electrolytic currents produced thereby still tend to pass reversely through the indicating means.

5. Means for determining the relative electrolytic activity of spaced electrolytic areas comprising electrode means having a unitary frame member with a handle, a plurality of spaced pairs of dissimilar contact members mounted on said frame member, said pairs of contact members having contact portions located adjacent an outer surface of said device and being cooperably arranged for coincidental application to the surface of a mass to be electrolytically measured, electromotive indicating means, said pairs of contact members being connected to said indicating means in opposition so that electrical currents produced upon contact with an electrolytic material will tend to pass reversely through the indicating means, and adjustable supporting means connecting said pairs to said frame member and permitting adjustment of the spacing and positioning of the contact surfaces thereof.

6. Means for determining the relative electrolytic activity of spaced electrolytic areas comprising electrode means having an insulating handle, a transversely extending member secured to said handle, forwardly extending arms adjacent either end of said transversely extending member, a pair of dissimilar contact members formed in the face of both of said arms, said pairs of contact members having contact portions located adjacent an outer surface of said device and being cooperably arranged for coincidental application to the surface of a mass to be electrolytically measured, and electrical conduits within said electrode unit connecting the contact members in opposition and connected to a pair of terminals adapted for attachment to an electro-motive indicating means.

7. A manually manipulatable electrode unit comprising a pair of insulatingly supported contact members of dissimilar materials having contact portions presented outwardly adjacent an outer surface of said device and cooperably arranged for coincidental application to the dry surface of a mass to be electrolytically measured for determining the electrolytic activity thereof, one of said contact members comprising a solid conducting member, the other of said contact members comprising capillary means and a liquid of dissimilar electro-motive characteristics communicating therewith.

8. A manually manipulatable electrode unit adapted for contact with surfaces to indicate the electrolytic condition thereof comprising a pair of insulatingly supported contact members of dissimilar materials insulatingly supported on said device for determining the electrolytic activity thereof, one of said contact members comprising a conducting member, the other of said contact members comprising a capillary conduit member and a liquid of dissimilar electro-motive characteristics communicating therewith.

9. In a device for measuring the relative electrolytic activity of spaced, electrolytic areas having relatively dry surfaces against which electrode means may be forcefully pressed, said device comprising a manually manipulatable unit having a supporting handle and electrode means operatively mounted with respect to said handle and comprising a plurality of insulatingly spaced, pairs of dissimilar contact members, said pairs of contact members having contact portions facing outwardly of the surface of said device and operably arranged for coincidental application to the said surface of a mass to be electrolytically measured, terminal receiving means for receiving the terminals of an electrical current indicating means and connector means connecting said terminal receiving means and said contact members, said connector means being connected and arranged to conduct electrolytic currents induced in each of said pairs of contact members reversely with respect to said indicating means when the said electrodes are contacted with said electrolytic areas whereby to produce a predetermined or datum reading of said indicating means when the said pairs are associated with electrolytically equivalent areas and to produce a characteristic variation from said readings when either of said pairs are contacted with a material of varying electrolytic activity.

10. In a device for measuring the relative electrolytic activity of spaced, electrolytic areas having relatively dry surfaces against which electrode means may be forcefully pressed, said device comprising a manually manipulatable unit having a supporting handle and electrode means operatively mounted with respect to said handle and comprising a plurality of insulatingly spaced, pairs of dissimilar contact members, said pairs of contact members having contact portions facing outwardly of the surface of said device and operably arranged for coincidental application to the said surface of a mass to be electrolytically measured, terminal receiving means for receiving the terminals of an electrical current indicating means and connector means connecting said terminal receiving means and said contact members, said connector means being connected and arranged to conduct electrolytic currents induced in each of said pairs of contact members reversely with respect to said indicating means when the said electrodes are contacted with said electrolytic areas whereby to produce a predetermined or datum reading of said indicating means when the said pairs are associated with electrolytically equivalent areas and to produce a characteristic variation from said readings when either of said pairs are contacted with a material of varying electrolytic activity, and means for adjustably controlling the current flow in circuit with one of said pairs of contact members to permit adjustment of the said predetermined reading.

11. In a device for measuring the relative electrolytic activity of spaced, electrolytic areas having relatively dry surfaces against which electrode means may be forcefully pressed, said device comprising a manually manipulatable unit having a unitary frame with handle means thereon, a plurality of spaced pairs of dissimilar contact members insulatingly mounted on said frame, said pairs of contact members having contact portions in general alinement on an outer surface of said device, said portions being cooperably mounted for coincidental application to the surface of a mass to be electrolytically measured, a pair of terminal receiving members on said frame adapted to receive the terminals of an electrical current measuring instrument, and electrical connections between said contact members and said terminal receiving means for connecting the said pairs of contact members in opposition so that electrical currents produced upon contact with an electrolytic area will be directed reversely through said current measuring instrument.

12. A unitary electrode construction adapted for contact with a relatively solid surface for determining the electrolytic condition thereof, said unit comprising an elongated handle member, said handle member being operatively connected with a contact portion adjacent one extremity thereof, said contact portion insulatingly supporting a pair of electrodes of dissimilar material, said electrodes being supported in spaced relationship and having outer unobstructed contact surfaces in substantial alinement for cooperative, coincidental application to the surface of a mass to be electrolytically examined, and terminal receiving means electrolytically connected to said contacts and adapted to receive the terminals of the galvanometer.

FRANCIS C. ELLIS.